Aug. 4, 1959     H. A. GALLATIN     2,898,540
GENERATOR EXCITATION SYSTEM
Filed Dec. 22, 1955
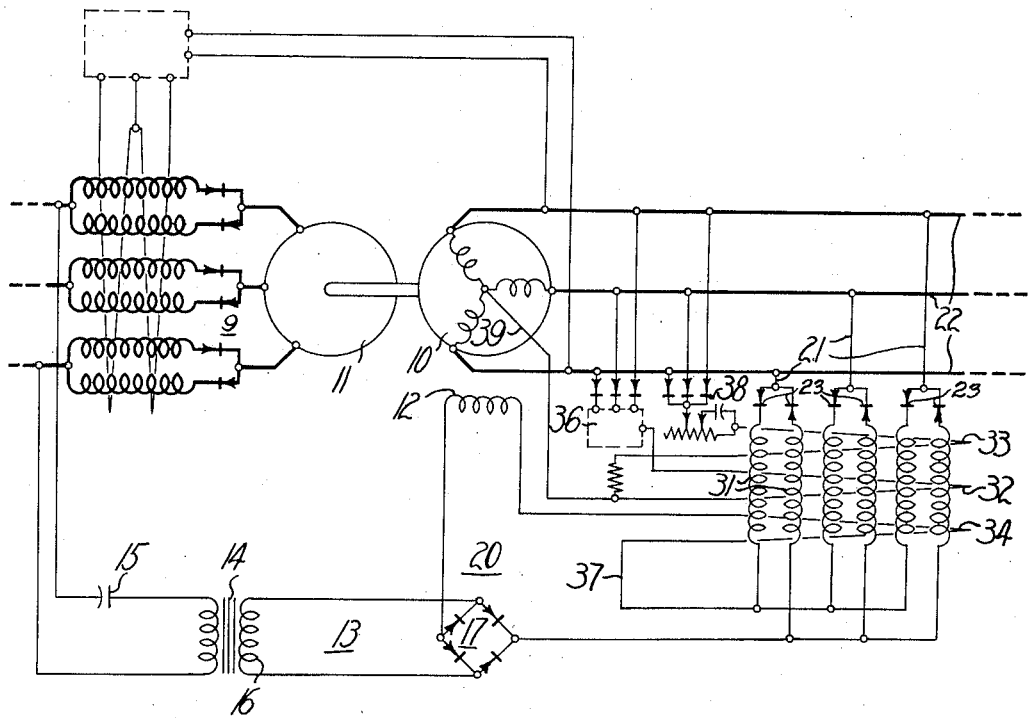
Inventor
Harold A. Gallatin
by Joseph E. Kerwin
Attorney

2,898,540

GENERATOR EXCITATION SYSTEM

Harold A. Gallatin, Wauwatosa, Wis., assignor to Allis-Chalmers Manufacturing Company, Milwaukee, Wis.

Application December 22, 1955, Serial No. 554,784

7 Claims. (Cl. 322—36)

This invention relates to an excitation system for an alternating current generator and especially to an improvement in the excitation and regulating systems of alternating current electric generators that may be a part of a motor generator set.

While it has been suggested that excitation initiating methods might be adapted for generators during starting operation, there are disadvantages in prior suggested methods or systems in that they are desired to be coordinated with the self-excitation systems for the generator once the output voltage of the generator is adequate for self-excitation. It has been found necessary, for example, in the past in order to coordinate the initiation and self-excitation systems, to provide switching means and switch operating circuitry to change from the initiating system to the self-excitation system.

Having in mind disadvantages of the prior suggested systems which include the initiating excitation required of the generator and the self-excitation provided, it is an object of this invention to simplify and improve the initiation and self-excitation systems of an alternating current generator.

Another object of this invention is to provide a coordinated system including excitation initiation for starting self-excitation of an alternating current generator and self-excitation for that generator without switches or switch operating circuitry.

Still another object of this invention is to provide excitation initiation and self-excitation without continued expense of appreciable power after the transition to self-excitation is accomplished.

Still another object of this invention is to provide a motor generator set in which an initiating D.C. current is provided to the generator field through static electrical components interrelated with a self-excitation system for the same generator field wherein the characteristics of the static components and their connection to suitable voltage sources for both initiating excitation and self-excitation are such that the change is automatic from the initiating source to the generator output self-excitation source.

Objects and advantages other than those above mentioned will be apparent from the following description when read in connection with the accompanying drawing in which:

The single figure illustrates a schematic showing of apparatus and circuits embodying this invention.

Generator 10 is connected to motor 11 to be driven thereby through suitable coupling means which preferably directly connects the generator to the motor so that they rotate at the same speed. The generator includes field winding 12 energized by direct current for excitation of the generator.

For initiating that excitation there is provided minimum excitation initiating circuit means 13. This includes a suitable voltage source, preferably the alternating current source supplying motor 11. That source of supply voltage is applied to the primary of transformer 14 in a circuit including impedance means such as capacitor 15 connected in series between the source and the primary. The transformer secondary 16 has its terminals connected to a first pair of conjugate or input points of a full wave bridge rectifier 17 supplying an initiating direct current to field winding 12 from the output terminals of the bridge rectifier.

A self-exciting circuit means 20 is supplied to the field winding. This circuit means of self-excitation is derived from the generator output. The three phase output 22 is conducted through leads 21 and rectifier means 23 to the generator field winding 12. Circuit means for this self-excitation supply conducts directly through the output terminals of bridge rectifier 17 in the secondary circuit of transformer 14. Both the initiating excitation circuit means and the interrelated self-excitation circuit means are preferably exclusively static components.

A regulating control system is provided to control the generator output. This regulating system is associated with the self-excitation circuit of the exciting system, and preferably the voltage regulating system also is limited to static components interrelated with the complete excitation system.

In the regulating system saturable reactor means having reactance windings 31 are added to the self-excitation circuit means. The illustrated three phase generator output has the saturable reactor means provided with six reactance windings arranged with rectifier means 23 as three phase doubler self-saturating magnetic amplifiers. These self-saturating magnetic amplifiers are referred to as a regulator power amplifier and preferably have three direct current saturating windings, a control winding 32, a bias winding 33, and a feedback winding 34. These last three windings are common to all three doubler self-saturating amplifiers.

Control winding 32 is supplied by a detector 36 across the generator output feeding a signal to that control winding in proportion to the voltage of the generator.

Control winding 32 is connected to the generator output through a suitable voltage detector 36. The direct current circuit from detector 36 through control winding 32 is completed by connection to the generator neutral 39. Thus, the generator is utilized effectively as a transformer supply for detector 36 to provide a control signal.

Bias winding 33 is supplied from a circuit connected to the generator output through rectifiers 38 and to the generator neutral which is brought out. Since the internal impedance of the generator is affected by power factor change, the current to the bias winding is responsive to variance in the power factor of the generator output. The internal generator stator impedance varies with the reactive component of line current. As a result of this supply connection for the bias winding, there is automatic correction of the saturable reactor output to the generator field winding resulting from change of the power factor. The third direct current winding, referred to as a feedback winding, is connected in series with the power amplifier anode reactance leads 37 and the generator field 12 to supply a positive feedback and to boost the overall gain of the power amplifier.

While the supply to transformer 14 may be any suitable source, it may, as shown, also be the supply to the generator drive motor 11. In such instance, as shown, there are, on the supply side of the system, doubler circuits of a regulating system, magnetic amplifiers 9 connected between the point where the supply to transformer 14 is tapped and the driving means of motor 11. Thus, during initial starting of induction motor 11 magnetic amplifiers 9 maintain suitable voltage between the taps for transformer 14.

In operation the excitation initiation circuit means comes into play when the incoming supply is applied to motor 11. This supply for example may be a 440 volt, 60 cycle, three phase system. Transformer 14 steps that supply voltage down suitably, say to 15 volts. This voltage at the terminals of the secondary of transformer 14 is rectified by full wave bridge rectifier 17 to deliver relatively low D.C. power to the generator field initiation excitation circuit means. In this arrangement no residual excitation need be depended upon.

As the generator voltage builds up to a percentage of its rated output, there is an overriding effect of the initiation excitation by the interrelated generator self-excitation circuit means. In effect this self-excitation circuit means short circuits the secondary of transformer 14 because the generator output voltage is applied through the output terminals of the full wave bridge rectifier 17 to the generator field. When this overriding condition has been effected the transformer primary circuit capacitor 15 absorbs the applied voltage from the motor source with negligible leading current across the incoming power line. Thus, the interrelated excitation initiating circuit means is caused to be ineffective at such time as the self-excitation circuit means takes over.

Although but a single embodiment of the present invention has been shown and described, it will be apparent to those skilled in the art that various changes and modifications may be made therein without departing from the spirit of the invention or from the scope of the appended claims.

It is claimed and desired to secure by Letters Patent:

1. A system comprising an alternating current generator having a field winding, a source of alternating voltage, a bridge rectifier, first circuit means connecting said source to said field winding with said source connected to the input of said bridge rectifier and said field winding connected to the output terminals of said bridge rectifier, a load circuit with said generator connected to said load circuit, and second circuit means connecting said load circuit to said field winding with the output terminals of said bridge rectifier in series between said load circuit and said field winding to provide a self-excitation circuit for said generator.

2. A system comprising an alternating current generator having a field winding, a source of alternating voltage, a bridge rectifier, first circuit means connecting said source to said field winding with said source connected to the input of said bridge rectifier and said field winding connected to the output terminals of said bridge rectifier, a load circuit with said generator connected to said load circuit, self-excitation circuit means connecting said load circuit to said field winding and including the output terminals of said bridge rectifier in series between said load circuit and said field winding, and impedance means in circuit with said source and the input of said bridge rectifier to absorb the voltage of said source when the potential of said load circuit to said rectifier is greater than the potential to said rectifier from said source.

3. In combination, an induction motor, an alternating current generator, coupling means interconnecting said motor and said generator whereby said generator is driven by said motor, a voltage source supplying said motor, a load circuit supplied by said generator, said generator having a direct current field winding, a source of initiating excitation for said field winding comprising a transformer having a primary connected to said voltage source with a capacitor in circuit between said voltage source and said primary, a full wave bridge rectifier, said transformer having a secondary supplying the input terminals of said full wave bridge rectifier, said field winding connected across the output terminals of said bridge rectifier, a self-excitation circuit including rectifying means for converting the alternating current of said load circuit to direct current supplying said field winding with the output terminals of said bridge rectifier connected in circuit between said field winding and said rectifying means, said motor driving said generator to cause said load circuit supplied thereby to have voltage resulting in said rectifier bridge conducting the field current from said rectifier means to said field with said capacitor in said transformer primary circuit absorbing the applied voltage of said voltage source.

4. The combination claimed in claim 1, wherein there is saturable reactor means having reactance windings connected in said excitation circuit with said rectifier means arranged to provide self-saturation of said reactance windings, and said saturable reactor means includes control winding means responsive to variations in the output voltage of said generator to vary the impedance of said reactance windings to vary the load circuit applied to said generator field winding through said self-excitation circuit.

5. The combination claimed in claim 2, wherein there is saturable reactor means connected in said excitation circuit arranged with said rectifying means to provide self-saturation of said reactance windings, said saturable reactor means including control winding means responsive to variations in an output characteristic of said generator to vary the impedance of said reactance windings and the current applied to said generator field winding through said excitation circuit means.

6. The combination claimed in claim 3 wherein there is saturable reactor means connected in said excitation circuit with said rectifying means arranged to provide self-saturation of said saturable reactor means, said saturable reactor means including control winding means responsive to variations in an output characteristic of said generator to vary the impedance of said saturable reactor means to vary the current applied to said generator field winding through said excitation circuit.

7. In an alternating current system, an alternating current generator having a field winding, minimum excitation initiating means comprising a source of alternating current, a bridge rectifier having input terminals and output terminals, first circuit means connecting said input terminals to said alternating current source, fixed impedance means in series with said first circuit means, second circuit means connecting said output terminals to said field winding, a load circuit connected to said generator, self-excitation means comprising third circuit means connecting said load circuit to said field winding with said rectifier output terminals in series between said load circuit and said field winding to excite said field winding.

References Cited in the file of this patent

UNITED STATES PATENTS

| 2,081,995 | Gulliksen | June 1, 1937 |
| 2,111,408 | Schroter | Mar. 15, 1938 |
| 2,321,969 | Bany | June 15, 1943 |
| 2,558,572 | Logan | June 26, 1951 |
| 2,781,487 | Kennedy | Feb. 12, 1957 |

FOREIGN PATENTS

| 387,921 | Great Britain | Feb. 16, 1933 |